US009776143B2

(12) United States Patent
Krause et al.

(10) Patent No.: US 9,776,143 B2
(45) Date of Patent: Oct. 3, 2017

(54) LOW CUT-OFF ULTRAFILTRATION MEMBRANES

(71) Applicant: GAMBRO LUNDIA AB, Lund (SE)

(72) Inventors: Bernd Krause, Rangendingen (DE); Markus Hornung, Nehren (DE); Johannes Geckeler, Hechingen (DE)

(73) Assignee: GAMBRO LUNDIA AB, Lund (SE)

(*) Notice: Subject to any disclaimer, the term of this patent is extended or adjusted under 35 U.S.C. 154(b) by 382 days.

(21) Appl. No.: 14/379,594

(22) PCT Filed: Mar. 4, 2013

(86) PCT No.: PCT/EP2013/054263
§ 371 (c)(1),
(2) Date: Aug. 19, 2014

(87) PCT Pub. No.: WO2013/131848
PCT Pub. Date: Sep. 12, 2013

(65) Prior Publication Data
US 2015/0060372 A1 Mar. 5, 2015

(30) Foreign Application Priority Data
Mar. 5, 2012 (EP) .................................... 12158074

(51) Int. Cl.
B01D 71/68 (2006.01)
B01D 61/14 (2006.01)
B01D 67/00 (2006.01)
B01D 69/12 (2006.01)
B01D 69/02 (2006.01)
B01D 69/08 (2006.01)

(52) U.S. Cl.
CPC .......... *B01D 71/68* (2013.01); *B01D 61/145* (2013.01); *B01D 67/0095* (2013.01); *B01D 69/02* (2013.01); *B01D 69/08* (2013.01); *B01D 69/087* (2013.01); *B01D 69/12* (2013.01); *B01D 2323/12* (2013.01); *B01D 2325/20* (2013.01)

(58) Field of Classification Search
CPC ............ B01D 2323/12; B01D 2325/20; B01D 61/145; B01D 67/0095; B01D 69/02; B01D 69/08; B01D 69/087; B01D 69/12; B01D 71/68
See application file for complete search history.

(56) References Cited

U.S. PATENT DOCUMENTS 4,824,568 A 4/1989 Allegrezza et al.
2003/0178368 A1 9/2003 Van Reis et al.
(Continued)

FOREIGN PATENT DOCUMENTS

DE 102004008220 9/2005
EP 1842581 7/2007
(Continued)

OTHER PUBLICATIONS

PCT Search Report and Written Opinion for PCT/EP2013/054263, completed Mar. 22, 2013.

Primary Examiner — John Kim
(74) Attorney, Agent, or Firm — Barnes & Thornburg LLP

(57) ABSTRACT

Porous hollow fiber membranes having a low molecular weight cut-off, processes for their production, and their use for separation tasks in the fields of biotechnology, pharmaceutical technology and food processing.

11 Claims, 2 Drawing Sheets

(56) References Cited

U.S. PATENT DOCUMENTS

| | | | |
|---|---|---|---|
| 2006/0096912 A1 | 5/2006 | Nussbaumer et al. | |
| 2006/0234582 A1* | 10/2006 | Gohl .................. | B01D 71/68 |
| | | | 442/194 |
| 2008/0000828 A1 | 1/2008 | Wechs et al. | |
| 2010/0320146 A1* | 12/2010 | Krause .................. | B01D 69/02 |
| | | | 210/638 |
| 2011/0031184 A1* | 2/2011 | Krause .................. | B01D 69/02 |
| | | | 210/500.23 |

FOREIGN PATENT DOCUMENTS

| | | |
|---|---|---|
| EP | 2042230 | 4/2009 |
| EP | 2253371 | 11/2010 |
| WO | WO96/02317 | 2/1996 |
| WO | WO2004/056459 | 7/2004 |
| WO | WO2008/046779 | 4/2008 |

* cited by examiner

LOW CUT-OFF ULTRAFILTRATION MEMBRANES

CROSS-REFERENCE TO RELATED APPLICATIONS

This application is the U.S. national phase of PCT/EP2013/054263 filed Mar. 4, 2013. PCT/EP2013/054263 claims the benefit under the Paris Convention of the Mar. 5, 2012 filing date of EP 12158074.0. The disclosures of both EP 12158074.0 and PCT/EP2013/054263 are hereby incorporated herein in their entireties by reference.

TECHNICAL FIELD

The present invention relates to porous hollow fiber membranes having a low molecular weight cut-off, processes for their production, and their use for separation tasks in the field of biotechnology.

BACKGROUND OF THE INVENTION

A challenge in the production of ultrafiltration membranes is to create a membrane having pores which are small enough to allow effective retention of macromolecules and at the same time maintaining an acceptable flow rate of the fluid to be filtered. This goal becomes increasingly difficult to achieve with decreasing molecular weight cut-off, i.e., decreasing pore size in the separation layer of the membrane, as there normally is a correlation between pore size and hydraulic permeability. Several proposals have been made to overcome this limitation. Examples include providing the membrane surface with permanent charges to increase rejection, or combining the fine pored separation layer with a microporous support structure, respectively.

US 2006/096912 A1 discloses cellulose hydrate ultrafiltration membranes having improved filtration performance, in particular an improved ratio of the membrane's flux to its rejection, and a process for their production. The process comprises tempering a cellulose ester membrane and saponifying the tempered membrane.

US 2003/178368 A1 discloses charged cellulosic filtration membranes produced by covalently modifying the membrane's surface with a charged compound or a compound capable of being chemically modified to possess a charge.

U.S. Pat. No. 4,824,568 A discloses composite ultrafiltration membranes based on PVDF which are produced by forming an ultrafiltration membrane structure on a preformed microporous membrane. A polymeric coating is cast onto a microporous membrane's surface and then cross-linked in place to provide a charge to the membrane.

WO 96/02317 A1 discloses a cellulosic ultrafiltration membrane made from a microporous base resistant substrate and a thin cellulose or cellulose ester polymer ultrafiltration layer.

EP 1 842 581 B1 discloses a method for preparing highly asymmetric ultrafiltration membranes. The flat sheet ultrafiltration membranes are prepared by casting a film of a solution or dispersion of a sulfone polymer and coagulating the film in a quench bath. The membranes show improved flow rates and have a high degree of asymmetry between the size of pores at the skin face of the membrane and the size of pores at the opposite face of the membrane.

WO 2004/056459 A1 discloses permselective asymmetric hollow fiber membranes comprising at least one hydrophobic polymer and at least one hydrophilic polymer. The membranes have an outer surface having 10,000 to 150,000 pores per $mm^2$ with a pore size in the range of 0.5-3 µm. Low flux membranes having a selective layer with pores sized 5-10 nm and a cut-off of about 5 kDa in the presence of whole blood are disclosed. In aqueous solutions, cut-off will be much larger than 5 kDa.

EP 2 042 230 A1 discloses hydrophilic membranes for haemodialysis and haemodiafiltration which have been treated with a nonionic surfactant. Asymmetric membranes comprising polysulfone, polyethersulfone or polyarylethersulfone, and polyvinylpyrrolidone are disclosed which have an average pore size below 6 nm, and a sieving coefficient for albumin in whole blood of below 0.01. The ultrafiltration membranes are prepared using a center fluid containing 40-50 wt % NMP and 50-60 wt % water.

It has now been found that improved porous hollow fiber ultrafiltration membranes comprising polysulfone, polyethersulfone or polyarylethersulfone, and polyvinylpyrrolidone can be obtained by a particular selection of certain parameters of the production process.

SUMMARY OF THE INVENTION

It is an object of the present invention to provide porous hollow fiber ultrafiltration membranes comprising polysulfone, polyethersulfone or polyarylethersulfone, and polyvinylpyrrolidone which combine a low molecular weight cut-off with augmented hydraulic permeability and high pressure stability.

According to one aspect of the invention, a process for the production of a porous hollow fiber ultrafiltration membrane is provided. The process comprises spinning a hollow fiber membrane from a solution containing polysulfone, polyethersulfone or polyarylethersulfone, and polyvinylpyrrolidone through the outer ring slit of a hollow fiber spinning nozzle, and simultaneously extruding a center fluid comprising 60 to 100 wt % water through the inner bore of the hollow fiber spinning nozzle, into a precipitation bath, at a spinning speed of 1 to 20 m/min.

DETAILED DESCRIPTION

Figure 1:
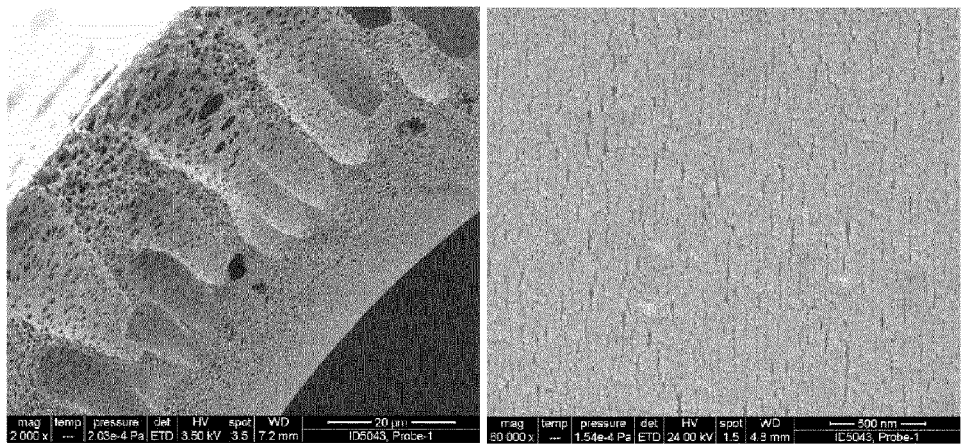
FIG. 1 shows scanning electron micrographs (SEM) of the cross-section of the hollow fiber membrane [Magnification 2,000; the white bar indicates 20 µm] and the inner surface [Magnification 60,000; the white bar indicates 500 nm] produced in Example 1.

According to the invention, a porous hollow fiber ultrafiltration membrane comprising polysulfone, polyethersulfone or polyarylethersulfone, optionally in combination with polyamide, and polyvinylpyrrolidone is provided having a sieving coefficient for inulin (average molecular weight 5.2 kDa) in aqueous solution of less than 0.25 and a hydraulic permeability in the range of from 1 to $15 \times 10^{-4}$ $cm^3/cm^2 \times s \times bar$.

The membrane is based on at least one hydrophobic polymer selected from the group consisting of polysulfones, polyethersulfones (PES) or polyarylethersulfones (PAES), optionally in combination with polyamide (PA). The membrane also comprises polyvinylpyrrolidone (PVP). In one embodiment, a polyvinylpyrrolidone which consists of a low molecular weight component having a molecular weight of below 100 kDa and a high molecular weight component having a molecular weight of 100 kDa or more is used for preparing the membrane.

In one embodiment, the membrane comprises 80-99 wt % of polyethersulfone and 1-20 wt % of polyvinylpyrrolidone (PVP), relative to the total weight of the membrane.

An example of a suitable polyethersulfone is a polymer having the general formula —[O-Ph-$SO_2$-Ph-]$_n$—, a weight average molecular weight of about 60,000 to 65,000 Da, preferably 63,000 to 65,000 Da, and a $M_w/M_n$ of about 1.5 to 1.8.

In one embodiment of the invention, the PVP comprised in the membrane consists of a high ($\geq$100 kDa) and a low (<100 kDa) molecular weight component and comprises 10-50 wt %, based on the total weight of PVP in the membrane, of a high molecular weight component, and 50-90 wt %, based on the total weight of PVP in the membrane, of a low molecular weight component.

The porous hollow fiber ultrafiltration membrane has the selective layer on the inside. It shows low protein adsorption due to its structure which is comprised of hydrophobic and hydrophilic micro-domains. Due to its hydrophilicity, the membrane shows spontaneous wetting when brought in contact with water.

In one embodiment, the membrane is asymmetric. In one embodiment, the membrane has a sponge structure. In another embodiment, the hollow fiber membrane comprises a layer having a finger structure. In still another embodiment, the hollow fiber membrane has a four-layer structure.

The inner layer of the four-layer structure, i.e. the blood contacting layer and the inner surface of the hollow fiber membrane, is a separation layer in the form of a dense thin layer having, in one embodiment, a thickness of less than 5 μm, e.g., 1 to 3 μm, and a pore size in the nano-scale range. To achieve high selectivity, the pore channels with the responsible pore diameters are short, i.e. below 0.1 μm. The pore channel diameter has a low variation in size.

The next layer in the hollow fiber membrane is the second layer having the form of a sponge structure and, in one embodiment of the present invention, a thickness of about 1 to 25 μm, and serves as a support for said first layer.

The third layer has the form of a finger structure. It provides for mechanical stability on the one hand; on the other hand it has, due to the high void volume, a very low resistance of transport of molecules through the membrane when the voids are filled with water. The third layer has, in one embodiment of the present invention, a thickness of 20 to 60 μm.

The fourth layer in this embodiment of the present invention is the outer layer, which is characterized by a homogeneous and open pore structure with a defined surface roughness. In one embodiment, the number average size of the pore openings is in the range of 0.5-3 μm. In one embodiment, this fourth layer has a thickness of about 1 to 10 μm.

In one embodiment, the hollow fiber membrane has an inner diameter of from 150 to 1000 μm. In one embodiment, the inner diameter is 200 to 550 μm, for instance, 290 to 520 μm.

In one embodiment, the wall thickness of the hollow fiber is in the range of from 35 to 100 μm. In one embodiment, the wall thickness is from 45 to 90 μm, for instance, from 50 to 80 μm.

The membrane of the present invention has a sieving coefficient for inulin (from chicory; CAS number 9005-80-5; MW 5.2 kDa; Sigma-Aldrich I2255) in aqueous solution of less than 0.25, e.g., less than 0.20, for instance, not more than 0.16, e.g. 0.10 or less.

The membrane of the present invention has a hydraulic permeability of water at 37° C. in the range of from 1 to $15 \times 10^{-4}$ $cm^3/cm^2 \times s \times bar$, e.g., 1.5 to $10 \times 10^{-4}$ $cm^3/cm^2 \times s \times bar$, or 3.5 to $8 \times 10^{-4}$ $cm^3/cm^2 \times s \times bar$.

The membrane of the present invention has a bursting pressure of more than 3 bar (gauge pressure), e.g. in the range of from 3.5 to 8 bar(g), for instance, 4 to 7 bar(g).

Due to its particular composition and structure, the membrane of the present invention does not require the addition of pore stabilizers like glycerol. Commercially available ultrafiltration membranes with low molecular weight cut-off are impregnated with glycerol to prevent collapse of their pore structure. Therefore, they have to be thoroughly rinsed with ethanol and/or water to wet the membrane material and wash out the glycerol from the pore volume before they can be used for filtration. This pre-treatment is cumbersome and time-consuming. In contrast to that, the membrane of the present invention can be stored in the dried state and directly be used without pre-treatment. Additionally, processes for their production are simplified as they do not involve an impregnation step of the membrane with a pore-stabilizing additive.

The porous hollow fiber ultrafiltration membrane of the present invention can be prepared by a continuous solvent phase inversion spinning process, comprising the steps of a) dissolving at least one polysulfone, polyethersulfone (PES), or polyarylethersulfone (PAES), optionally in combination with polyamide (PA), and at least one polyvinylpyrrolidone (PVP) in at least one solvent to form a polymer solution;

b) extruding the polymer solution through an outer ring slit of a nozzle with two concentric openings into a precipitation bath; simultaneously c) extruding a center fluid through the inner opening of the nozzle;

d) washing the membrane obtained; and subsequently e) drying the membrane, wherein the center fluid comprises 65 to 100 wt % water and 0 to 35% solvent; and the membrane is spun at a speed of from 1 to 20 m/min.

In one embodiment, the spinning solution for preparing a membrane according to the present invention comprises from to 30 wt %, e.g., 14 to 19 wt %, relative to the total weight of the solution, of polyethersulfone and from 1 to 15 wt %, e.g. 5 to 11.25 wt %, relative to the total weight of the solution, of PVP, wherein said PVP consists of 0 to 10 wt %, e.g. 3 to 8 wt %, relative to the total weight of the solution, of a low molecular weight (<100 kDa) PVP component and 1 to 10 wt %, e.g. 2 to 3.5 wt %, relative to the total weight of the solution, of a high molecular weight ($\geq$100 kDa) PVP component. In one embodiment, the total PVP contained in the spinning solution consists of from 22 to 45 wt %, e.g., from 25 to 30 wt %, of a high molecular weight ($\geq$100 kDa) component and from 55 to 78 wt %, e.g., from 70 to 75 wt %, of a low molecular weight (<100 kDa) component. Examples for high and low molecular weight PVP are, for example, PVP K85/K90 and PVP K30, respectively.

In a particular embodiment, the polymer solution used in the process for preparing the membrane of the present invention further comprises 50 to 89 wt %, e.g., 64 to 76 wt % of solvent, relative to the total weight of the solution, and 0 to 10 wt %, relative to the total weight of the solution, of water. In one embodiment, water is present in the spinning solution in an amount of from 3 to 7 wt %, relative to the total weight of the solution. In one embodiment, the solvent used in the process is chosen from the group consisting of N-methylpyrrolidone (NMP), N-ethylpyrrolidone, N-octylpyrrolidone, dimethylacetamide (DMAC), dimethylsulfoxide (DMSO), dimethylformamide (DMF), butyrolactone and mixtures of said solvents. In a particular embodiment, NMP is used as the solvent.

The viscosity of the polymer solution, measured according to DIN EN ISO 1628-1 at 22° C., usually is in the range of from 300 to 300,000 mPa·s, e.g., from 4,000 to 66,000 mPa·s, or even 5,000 to 30,000 mPa·s.

The center fluid or bore liquid which is used for preparing the membrane according to the invention comprises 65 to 100 wt % of water and 0 to 35 wt % of solvent. In one embodiment of the process, the center fluid comprises 70 to 90 wt % of water and 10 to 30 wt % of solvent. In another embodiment, the center fluid comprises 75 to 90 wt % of water and 10 to 25 wt % of solvent. In another embodiment, the center fluid comprises 100 wt % of water. In a particular embodiment, the center fluid comprises 70-90 wt % of water and 10-30 wt % of NMP.

In certain embodiments, the center fluid additionally comprises a further additive to modify the surface of the membrane in order to further increase the performance of the membrane. In one embodiment of the invention, the amount of the additive in the center fluid is from 0.02 to 2 wt %, for example from 0.05 to 0.5 wt %, or from 0.05 to 0.25 wt %, relative to the total weight of the center fluid.

Examples of suitable additives include hyaluronic acid and zwitterionic polymers as well as copolymers of a vinyl polymerizable monomer having a zwitterion in the molecule and another vinyl polymerizable monomer. Examples of zwitterionic (co)polymers include phosphobetains, sulfobetains, and carboxybetains.

In one embodiment of the process for preparing the membrane, the temperature of the nozzle is 10-60° C., e.g., 20-55° C., for instance, 30-45° C. The distance between the opening of the nozzle and the precipitation bath is from 0 to 125 cm. The precipitation bath has a temperature of 2 to 95° C., e.g. 5 to 25° C. In one embodiment, the spinning speed is in the range of 1 to 20 m/min, for instance, 5 to 15 m/min, or even 5 to 12.5 m/min.

In one embodiment of the process, the polymer solution coming out through the outer slit opening of the nozzle (spinneret) is guided through a spinning shaft with controlled atmosphere.

In one embodiment, the precipitating fiber is exposed to a humid steam/air mixture comprising a solvent in a content of from 0 to 10 wt %, for instance, from 0 to 5 wt %, or from 0 to 3 wt %, relative to the water content. The temperature of the humid steam/air mixture is at least 15° C., for instance, at least 25° C., and at most 75° C., e.g. not higher than 62° C. Further, the relative humidity in the humid steam/air mixture is from 60 to 100%.

In one embodiment of the process, the precipitation bath comprises from 20 to 100 wt % of water and from 0 to 80 wt % of solvent, e.g. NMP. In another embodiment, the precipitation bath comprises from 25 to 100 wt % water and from 0 to 75 wt % NMP.

The membrane then is washed to remove residual solvent and low molecular weight components. In a particular embodiment of a continuous process for producing the membrane, the membrane is guided through several water baths. In certain embodiments of the process, the individual water baths have different temperatures. For instance, each water bath may have a higher temperature than the preceding water bath.

The membrane then is dried and subsequently may be sterilized. In one embodiment, the hollow fiber membrane subsequently is steam-sterilized at temperatures of at least 121° C. for at least 21 minutes.

The membrane of the invention can advantageously be used in filtration devices. Such devices generally consist of a casing comprising a tubular section with end caps capping the mouths of the tubular section. A bundle of hollow fiber membranes is usually arranged in the casing in a way that a seal is provided between the first flow space formed by the fiber cavities and a second flow space surrounding the membranes on the outside.

The membrane of the invention can advantageously be used in pharmaceutical or biotechnological processes or food processing, for instance, in the removal of salts and/or low molecular weight byproducts from product solutions (product streams) by way of dialysis, or in increasing the concentration of a product having a molecular weight above the cut-off of the membrane in a solution by way of ultrafiltration. Examples include downstream processing of fermentation broths, concentration and purification of peptides in blood plasma, concentration of protein in milk, whole egg or egg white with simultaneous removal of salts and sugars, concentration of gelling agents and thickeners like agar, carrageen, pectins, or gelatine.

It will be understood that the features mentioned above and those described hereinafter can be used not only in the combination specified but also in other combinations or on their own, without departing from the scope of the present invention.

The present invention will now be described in more detail in the examples below. The examples are not intended to limit the scope of the present invention, but are merely an illustration of particular embodiments of the invention.

ANALYTICAL METHODS i) Membrane Bundle Preparation

[A] Preparation of Hand Bundles:

To prepare fiber bundles for performance tests, the fiber bundles are first cut to a defined length of 23 cm. Then the ends of the fibers are closed by melting. An optical control ensures that all fibers are well melted. Then the ends of the fiber bundle are transferred into a potting cap. The potting cap is fixed mechanically and a potting tube is put over the potting caps and the fibers are potted with polyurethane. After the polyurethane has hardened, the potted membrane bundle is cut to a defined length and stored dry before it is used for the different performance tests.

[B] Preparation of Mini-Modules:

Mini-modules [=fiber bundles in a housing] are prepared in a similar manner. The mini-modules ensure protection of the fibers and are used for steam-sterilization with residual water on the fiber. The manufacturing of the mini-modules differs in the following points:

The number of fibers required is calculated for an effective surface A of 360 cm² according to equation (1)

$$A = \pi \cdot d_i \cdot l \cdot n \, [\text{cm}^2] \quad (1)$$

with
- $d_i$=inner diameter of fiber [cm]
- n=amount of fibers
- l=effective fiber length [cm]

The fiber bundle is cut to a defined length of 20 cm

The fiber bundle is transferred into the housing before melting the fiber ends and performing the subsequent steps.

[C] Preparation of filters:

The filter (=dialyzer) comprises about 8,000 to 10,000 fibers with an effective surface area of 1.4 m². A filter is characterized by a cylindrical housing with two connectors for the dialyzing fluid and caps applied on both ends, each with one centered blood connector. The manufacturing process (after winding) can be divided into the following main steps:
- the cut bundles (length approx. 30 cm) are transferred into the housing with a special bundle claw;
- both ends of the bundles are closed by a closing process
- the fibers are potted into the housing with polyurethane (PUR);
- the ends are cut to open the fibers;
- the caps are welded to the blood connectors using ultrasonic welding;
- final treatment comprises: rinsing, integrity testing, final drying
- the filters are packed in sterile bags and steam sterilized.

ii) Hydraulic Permeability (Lp) of Hand Bundles and Mini-Modules

The hydraulic permeability of a membrane bundle is determined by pressing a defined volume of water under pressure through the membrane bundle, which has been sealed on one side, and measuring the required time. The hydraulic permeability can be calculated from the determined time t, the effective membrane surface area A, the applied pressure p and the volume of water pressed through the membrane V, according to equation (2):

$$Lp=V/[p \cdot A \cdot t] \qquad (2)$$

From the number of fibers, the fiber length as well as the inner diameter of the fiber, the effective membrane surface area A is calculated. The membrane bundle has to be wetted thirty minutes before the Lp-test is performed. For this purpose, the membrane bundle is put in a box containing 500 ml of ultrapure water. After 30 minutes, the membrane bundle is transferred into the testing system. The testing system consists of a water bath that is maintained at 37° C. and a device where the membrane bundle can be mounted. The filling height of the water bath has to ensure that the membrane bundle is located underneath the water surface in the designated device. To avoid that a leakage of the membrane leads to a wrong test result, an integrity test of the membrane bundle and the test system has to be carried out in advance. The integrity test is performed by pressing air through the membrane bundle that is closed on one side of the bundle. Air bubbles indicate a leakage of the membrane bundle or the test device. It has to be checked if the leakage is due to an incorrect mounting of the membrane bundle in the test device or if a real membrane leakage is present. The membrane bundle has to be discarded if a leakage of the membrane is detected. The pressure applied in the integrity test has to be at least the same value as the pressure applied during the determination of the hydraulic permeability in order to ensure that no leakage can occur during the measurement of the hydraulic permeability because the pressure applied is too high.

iii) Selectivity/Sieving Coefficient (SC) for Inulin of Hand Bundles, Mini-Modules and Filters The selectivity of a membrane is determined by sieving coefficient measurements. Inulin is chosen as a marker as it has a MW of 5.2 kDa and is therefore suited to determine if a membrane has a cut-off in the range of 1-3 kDa. The test is performed in recirculating mode and with a controlled ultrafiltration rate. 100 mg inulin (from chicory; Sigma-Aldrich 12255) is dissolved in 1000 ml ultrapure water. The solution is stirred at 60° C. for one hour and then allowed to cool to room temperature. 50 ml of the solution are used per experiment. The experiment is conducted at room temperature and the testing solution is stirred during the whole experiment. QFeed is calculated according to equation (3) as a function of the shear rate ($\gamma$), the number of fibers (n) and the inner diameter ($d_i$). The shear rate is kept at 460 l/s. QUF is calculated according to equation (4) from the intrinsic flow rate ($J_v$ in cm/s). An intrinsic flow rate of $0.7 \times 10^{-4}$ is used.

$$Q\text{Feed [ml/min]}=\gamma \ast n \ast di^3 \ast 60/32 \qquad (3)$$

$$QUF \text{ [ml/min]}=J_v \ast A \ast 60 \qquad (4)$$

The system is filled with the testing solution and air is removed carefully. A feed sample is taken. The ultrafiltration rate is controlled and kept constant with a clamp on the retentate side. Time measurement is started when the desired ultrafiltration rate has been reached. Samples of the feed, the filtrate and the retentate are taken after 0 and 15 minutes. The flow rates and the pressures are monitored.

The concentration of inulin in the feed (in), in the retentate (r) and in the filtrate (f) is determined by UV/VIS spectroscopy after complex formation with resorcinol and the sieving coefficient (SC) is calculated according to equation (5):

$$SC \text{ [\%]}=2\ast c(f)/[c(in)+c(r)]\ast 100\% \qquad (5)$$

If the concentration of inulin in the filtrate is zero, the sieving coefficient equals 0%. If the concentration of inulin in the filtrate equals the concentration of inulin in the feed and the retentate, the sieving coefficient is 100%.

iv) Dextrane Sieving Curves

Dextrane sieving curves are determined using a solution composed of dextranes with different molecular weights in the range of from 1 to 9.5 kDa. The following dextranes are used:
- Dextran 1, molecular weight: 1,000 Da
- Dextran 2, molecular weight: 5,000 Da
- Dextran 3, molecular weight: 6,000 Da
- Dextran 4, molecular weight: 9,500 Da The procedure is similar to the determination of the sieving coefficient for inulin as described above, with the following changes: 100 mg of each dextrane are dissolved in 100 ml ultrapure water. 25 ml of the solution containing the four dextranes are used per test. The shear rate is kept at 460 l/s. An intrinsic flow rate of $1.5 \times 10^{-4}$ is used. Testing time is prolonged to 60 minutes and samples are taken after 15 and 60 minutes. The concentration of the individual dextranes in the feed (in), in the retentate (r) and in the filtrate (f) is determined by GPC and the sieving coefficient for each dextrane is calculated according to equation (5).

v) Pressure Stability

Pressure stability of the membrane is determined by a bursting strength test on mini-modules. The fibers are wetted with RO water. The outlet of the mini-module is sealed and pressure is applied to the inlet of the mini-module. Starting with an air pressure of 2 bar(g), pressure is increased by 1 bar every 60 seconds, up to a maximum of 7 bar(g). The pressure curve is monitored to determine bursting pressure of the membranes in the mini-module, recognizable by a sudden pressure drop.

EXAMPLES

The term "viscosity" in respect of the polymer solution of the present invention means the dynamic viscosity, if not otherwise indicated. The Unit of the dynamic viscosity of the polymer solution is given in Centipoise (cP) or mPa·s. To measure the viscosity of the polymer solution a commercial Rheometer (MCR 101, Anton Paar GmbH) was used. The polymer solution is placed between two temperature-controlled plates. The measurement is performed at 22° C. All other measurement conditions are according to the manufacturer's instructions.

Example 1

A polymer solution was prepared by dissolving polyethersulfone (Ultrason® 6020, BASF SE) and polyvinylpyrrolidone (K30 and K85, BASF SE) and distilled water in N-methylpyrrolidone (NMP). The weight fraction of the different components in the polymer spinning solution was: PES:PVP K85:PVP K30:$H_2O$:NMP=14:2:5:3:76. The viscosity of the polymer solution was 6,000 mPa·s.

The sequence of adding the polymer material to the solvent, the temperature and the stirring time are important. A clear solution without any turbidity and bubbles is subsequently needed for a uniform morphology and performance of the membrane. Particles or bubbles in the polymer solution disturb the coagulation process and can lead to defects in membrane structure.

To prepare the solution, NMP and water were first filled into a 30 L container with finger-paddle agitator. The PVP was added to the NMP and stirred at 60° C. until a homogeneous clear solution was obtained. Finally, the polyethersulfone was added. The mixture was stirred at 60° C. until a clear highly viscous solution was obtained. The warm solution was cooled to 20° C. and degassed for 1-2 hours at 50 mmHg. The highly viscous polymer solution was transferred to a stainless steel container.

A center fluid was prepared by mixing distilled water and N-Methylpyrrolidone (NMP). The weight fraction of the two components in the center fluid was: $H_2O$:NMP=70 wt %:30 wt %.

The preparation of the center fluid was carried out as follows:
Distilled water was filled into a stainless steel container; NMP was added and the mixture was stirred for approximately 1 min;
The clear mixture was filtered into a second stainless steel container and degassed at 50 mmHg.

A membrane was formed by heating the polymer solution to 35° C. and passing the solution as well as the center fluid through a spinning die. The diameter of the inner bore was 180 μm and the diameter of the outer orifice was 500 μm. The temperature of the die was 35° C., the temperature of the spinning shaft was 32° C. The hollow fiber membrane was formed at a spinning speed of 12.5 m/min. The liquid capillary leaving the die was passed into a water bath having a temperature of 24° C. The distance between the die and the precipitation bath was 100 cm. The hollow fiber membrane formed was guided through 5 different water baths having a temperature of 65° C. and subsequently was wound onto a winding reel.

The fibers were cut into bundles and washed with water at 70° C. to remove traces of NMP and water-soluble polymer residuals. The water was removed from the bundles by centrifugal force and the bundles were dried for several hours with hot air at 50° C.

The hollow fiber membrane had an inner diameter of 290 μm, a wall thickness of 59 μm and a fully asymmetric membrane structure. The active separation layer of the membrane was at the inner side. The active separation layer is defined as the layer with the smallest pores.

FIG. 1 shows a scanning electron micrograph of the cross-section of the hollow fiber membrane [Magnification 2,000; the white bar indicates 20 μm] and the inner surface [Magnification 60,000; the white bar indicates 500 nm]. The wall has an asymmetric structure and the inner surface shows a very homogeneous pore size distribution.

The sieving coefficient for inulin was determined to be 16% (mean value of t=0 and t=15 min) and hydraulic permeability was $4.8 \times 10^{-4}$ $cm^3/cm^2 \times s \times bar$ (n=2)

Example 2

Example 1 was repeated using a center fluid containing 90 wt % water and 10 wt % NMP.

The hollow fiber membrane had an inner diameter of 293 μm and a wall thickness of 60 μm. The dry hollow fiber membrane had a fully asymmetric membrane structure. The active separation layer of the membrane was at the inner side.

Figure 2:
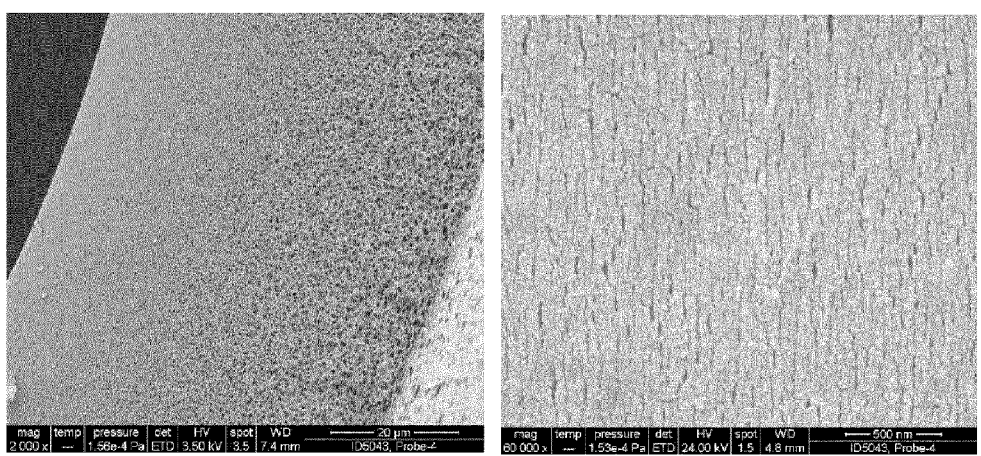
FIG. 2 shows scanning electron micrographs (SEM) of the cross-section of the hollow fiber membrane [Magnification 2,000; the white bar indicates 20 µm] and the inner surface [Magnification 60,000; the white bar indicates 500 nm] produced in Example 2.

FIG. 2 shows a scanning electron micrograph of the cross-section of the hollow fiber membrane [Magnification 2,000; the white bar indicates 20 μm] and the inner surface [Magnification 60,000; the white bar indicates 500 nm]. The wall has an asymmetric structure and the inner surface shows a very homogeneous pore size distribution.

The sieving coefficient for inulin was determined to be 9% (mean value of t=0 and t=15 min) and hydraulic permeability was $2.9 \times 10^{-4}$ $cm^3/cm^2 \times s \times bar$ (n=2). The increase of the water concentration in the center fluid (in comparison to Example 1) resulted in a denser inner surface and a reduction of the hydraulic permeability and the inulin sieving coefficient.

The pressure stability of the membrane was measured and found to be in the range of 6 bar (n=2).

Example 3

A polymer solution was prepared by dissolving polyethersulfone (Ultrason® 6020, BASF SE) and polyvinylpyrrolidone (K30 and K85, BASF SE) and distilled water in N-methylpyrrolidone (NMP). The weight fraction of the different components in the polymer spinning solution was: PES:PVP K85:PVP K30:$H_2O$:NMP=14:2.5:6:6:68.5. The viscosity of the polymer solution was 25,780 mPa·s.

A membrane was formed by heating the polymer solution to 35° C. and passing the solution as well as the center fluid through a spinning die. A center fluid containing 90 wt % water and 10 wt % NMP was used. The diameter of the inner bore was 180 μm and the diameter of the outer orifice was 700 μm. The temperature of the die was 35° C., the temperature of the spinning shaft was 32° C. The hollow fiber membrane was formed at a spinning speed of 12.5 m/min. The liquid capillary leaving the die was passed into a water bath having a temperature of 25° C. The distance between the die and the precipitation bath was 100 cm. The hollow fiber membrane formed was guided through 5 different water baths having a temperature of 65° C. and subsequently was wound onto a winding reel.

The fibers were cut into bundles and washed with water at 70° C. to remove traces of NMP and water-soluble polymer residuals. The water was removed from the bundles by centrifugal force and the bundles were dried for several hours with hot air at 50° C.

The hollow fiber membrane had an inner diameter of 494 µm, a wall thickness of 72 µm and a sponge-type asymmetric membrane structure. The active separation layer of the membrane was at the inner side.

The sieving coefficient for inulin was determined to be 10% (mean value of t=0 and t=15 min) and hydraulic permeability was $1.8 \times 10^{-4}$ cm$^3$/cm$^2 \times$s$\times$bar (n=2).

Example 4

Example 3 was repeated at a reduced spinning speed of 5.5 m/min.

The hollow fiber membrane obtained had an inner diameter of 501 µm and a wall thickness of 71 µm. The dry hollow fiber membrane had a fully asymmetric sponge-type structure. The active separation layer of the membrane was at the inner side.

Figure 3:
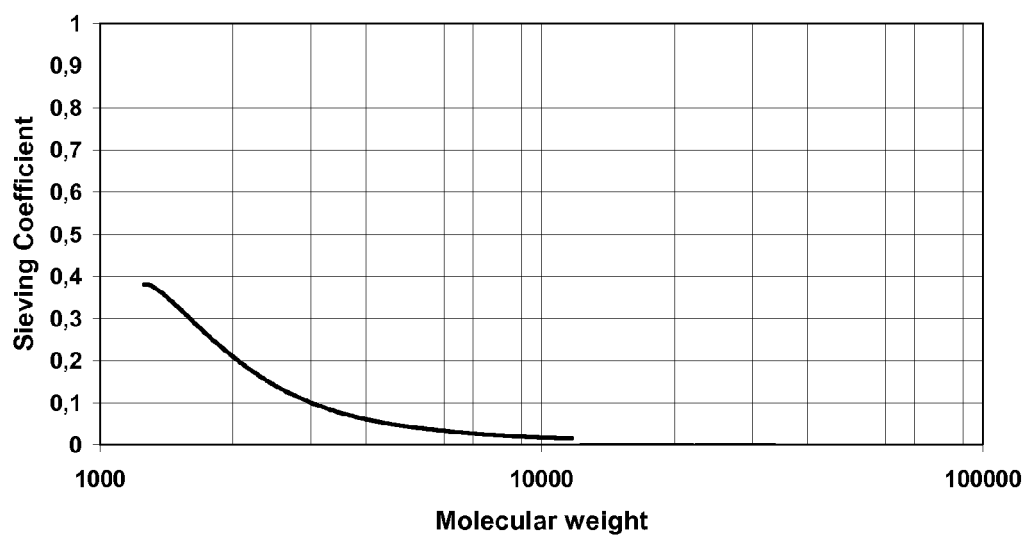
FIG. 3 shows the dextrane sieving curve of the hollow fiber membrane produced in Example 4 after 15 minutes testing time.

The sieving coefficient for inulin was determined to be 10% (mean value of t=0 and t=15 min) and hydraulic permeability was $2.6 \times 10^{-4}$ cm$^3$/cm$^2 \times$s$\times$bar (n=2). The reduction of the spinning speed, compared to Example 3, resulted in an increase in hydraulic permeability while the inulin sieving coefficient was the same. Dextrane sieving curves for the membrane are shown in FIG. 3.

Example 5

A polymer solution was prepared according to the composition of example 1. The viscosity of the polymer solution was 6,150 mPa·s.

A center fluid was prepared by mixing distilled water and N-Methylpyrrolidone (NMP). The weight fraction of the two components in the center fluid was: H$_2$O:NMP=70 wt %:30 wt %.

A membrane was formed by heating the polymer solution to 35° C. and passing the solution as well as the center fluid through a spinning die. The diameter of the inner bore was 120 µm and the diameter of the outer orifice was 360 µm. The temperature of the die was 35° C., the temperature of the spinning shaft was 30° C. The hollow fiber membrane was formed at a spinning speed of 12.5 m/min. The liquid capillary leaving the die was passed into a water bath having a temperature of 16° C. The distance between the die and the precipitation bath was 100 cm. The hollow fiber membrane formed was guided through 5 different water baths having a temperature of 65° C. and subsequently was wound onto a winding reel.

The fibers were cut into bundles and washed with water at 70° C. to remove traces of NMP and water-soluble polymer residuals. The water was removed from the bundles by centrifugal force and the bundles were dried for several hours with hot air at 50° C.

The hollow fiber membrane had an inner diameter of 217 µm, a wall thickness of 49 µm and a fully asymmetric membrane structure. The active separation layer of the membrane was at the inner side. The active separation layer is defined as the layer with the smallest pores.

The sieving coefficient for inulin was determined to be 23% (mean value of t=0 and t=15 min) and hydraulic permeability was $7.4 \times 10^{-4}$ cm$^3$/cm$^2 \times$s$\times$bar (n=2)

Comparative Example 1

A polymer solution was prepared by dissolving polyethersulfone (Ultrason® 6020, BASF SE), polyvinylpyrrolidone (K30 and K85, BASF SE), polyamide (Trogamid® T, Evonik Industries AG) and distilled water in N-methylpyrrolidone (NMP). The weight fraction of the different components in the polymer spinning solution was: PES:PVP K85:PVP K30:Trogamid T:H$_2$O:NMP=13.55:2:5:0.05:3:76.4. The viscosity of the polymer solution was 5,200 mPa·s.

A membrane was formed by passing the solution as well as a center fluid containing 56 wt % water and 44 wt % NMP through a spinning die. The diameter of the inner bore was 180 µm and the diameter of the outer orifice was 500 µm. The temperature of the die was 53° C., the temperature of the spinning shaft was 50° C. The hollow fiber membrane was formed at a spinning speed of 45 m/min. The liquid capillary leaving the die was passed into a water bath having a temperature of 25° C. The distance between the die and the precipitation bath was 100 cm. The hollow fiber membrane formed was guided through 5 different water baths having a temperature of 65° C., dried in an online-dryer and subsequently wound onto a winding reel.

The hollow fiber membrane had an inner diameter of 215 µm, a wall thickness of 50 µm and a fully asymmetric membrane structure. The active separation layer of the membrane was at the inner side.

The sieving coefficient for inulin was determined to be 54% (mean value of t=0 and t=15 min) and hydraulic permeability was $5.1 \times 10^{-4}$ cm$^3$/cm$^2 \times$s$\times$bar (n=2).

Comparative Example 2

Example 5 was repeated with a modified center fluid composition. The weight fraction of the two components in the center fluid was: H$_2$O:NMP=60 wt %:40 wt %.

The hollow fiber membrane obtained had an inner diameter of 214 µm and a wall thickness of 49 µm and a fully asymmetric membrane structure. The active separation layer of the membrane was at the inner side. The active separation layer is defined as the layer with the smallest pores.

The sieving coefficient for inulin was determined to be 65% (mean value of t=0 and t=15 min) and hydraulic permeability was $20.5 \times 10^{-4}$ cm$^3$/cm$^2 \times$s$\times$bar (n=2).

The invention claimed is:

1. A porous hollow fiber ultrafiltration membrane comprising at least one of a polysulfone, a polyethersulfone and a polyarylethersulfone, and polyvinylpyrrolidone and having a sieving coefficient for inulin with an average molecular weight of 5.2 kDa in aqueous solution of less than 0.25 and a hydraulic permeability of water at 37° C. in the range of from 1 to $15 \times 10^{-4}$ cm$^3$/cm$^2 \times$s$\times$bar.

2. The membrane according to claim 1, comprising 80-99 wt % of polyethersulfone and 1-20 wt % of polyvinylpyrrolidone (PVP), relative to the total weight of the membrane.

3. The membrane according to claim 2 having a four-layer structure.

4. The membrane according to claim 2 having a sponge structure.

5. The membrane according to claim 2 having a bursting pressure of more than 3 bar (g).

6. The membrane according to claim 1 having a four-layer structure.

7. The membrane according to claim 6 having a bursting pressure of more than 3 bar (g).

8. The membrane according to claim 1 having a sponge structure.

9. The membrane according to claim 8 having a bursting pressure of more than 3 bar (g).

10. The membrane according to claim 1 having a bursting pressure of more than 3 bar (g).

11. A diffusion and/or filtration device comprising a membrane according to claim 1.

\* \* \* \* \*